Sept. 17, 1935. C. S. JENNINGS 2,014,571
PNEUMATIC DISPATCH SYSTEM
Filed Oct. 31, 1933 4 Sheets-Sheet 1
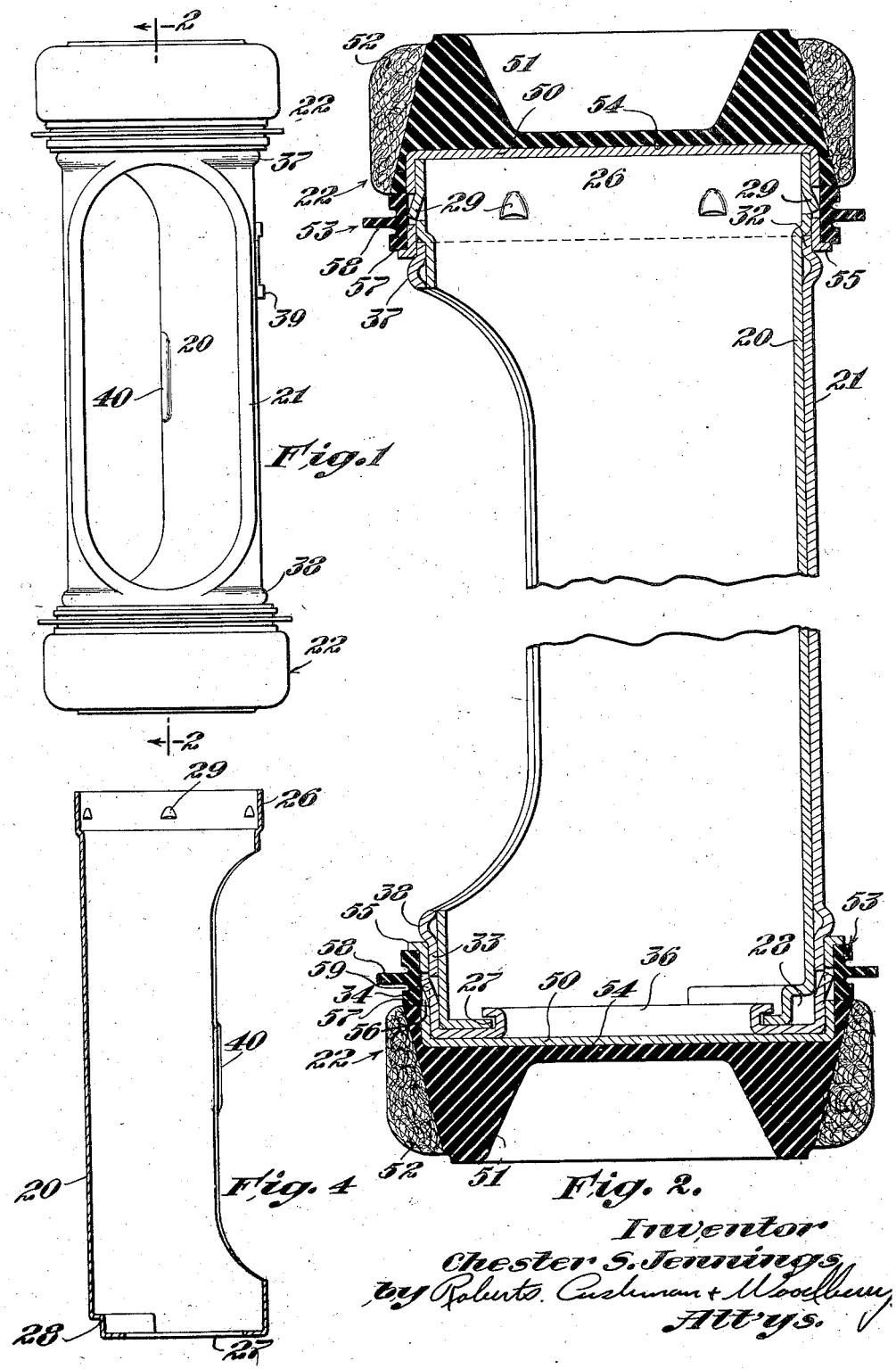
Inventor
Chester S. Jennings
by Roberts, Cushman + Woodbury
Att'ys.

Sept. 17, 1935.   C. S. JENNINGS   2,014,571
PNEUMATIC DISPATCH SYSTEM
Filed Oct. 31, 1933   4 Sheets-Sheet 2
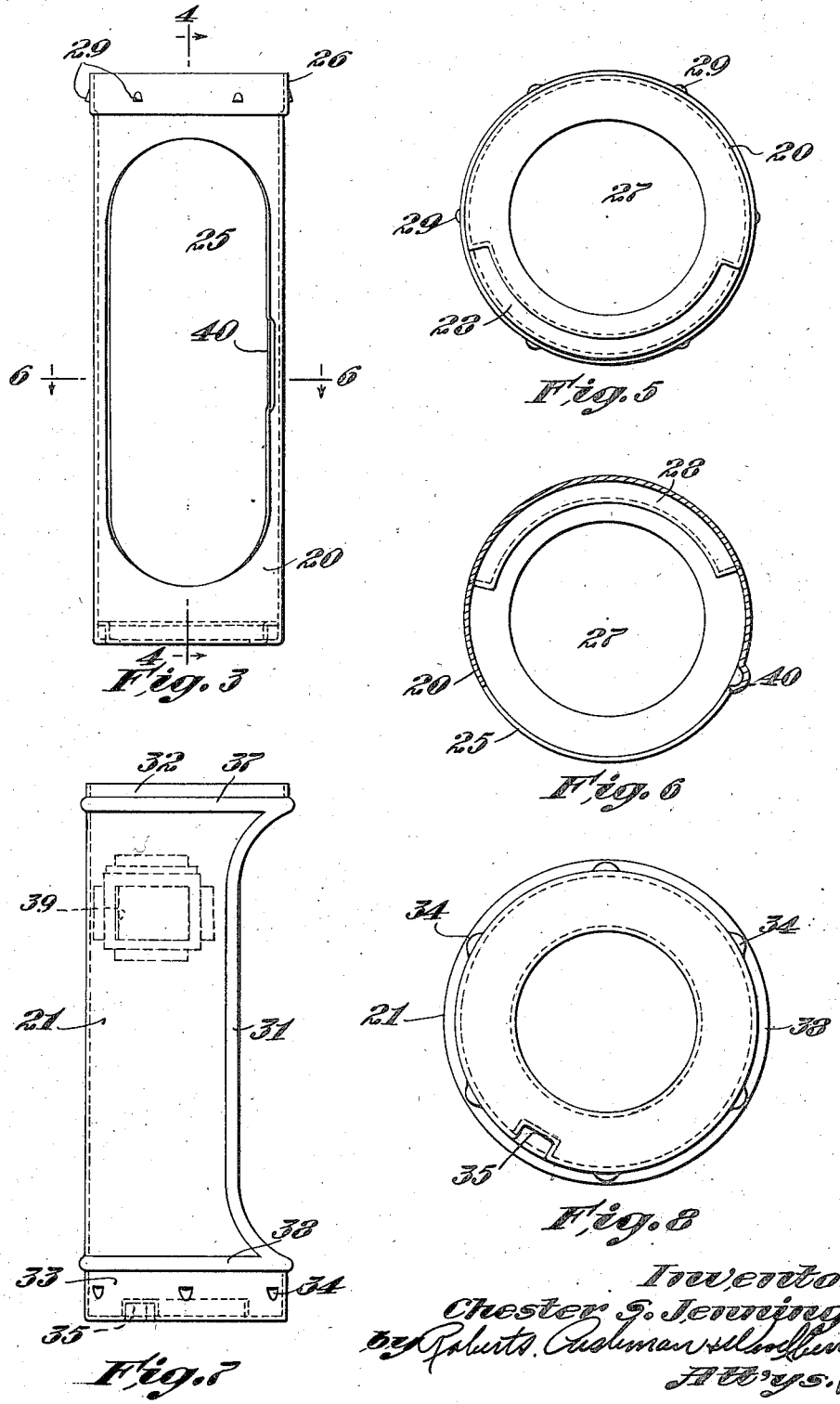

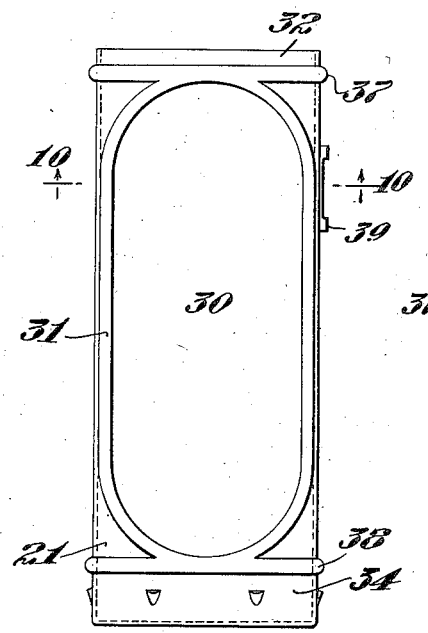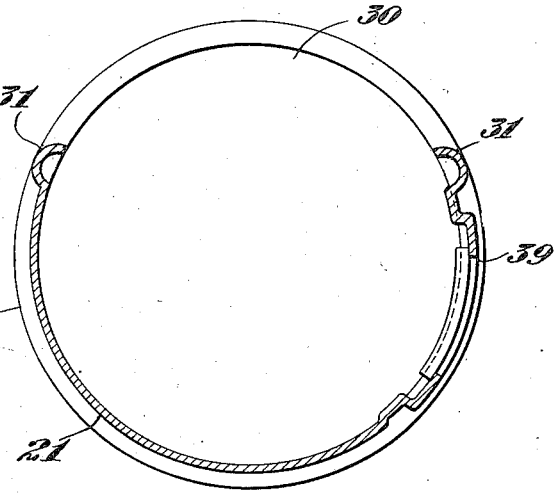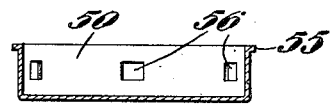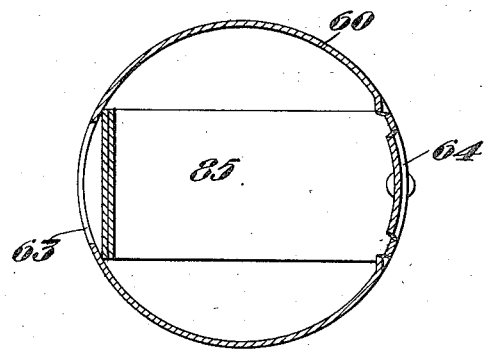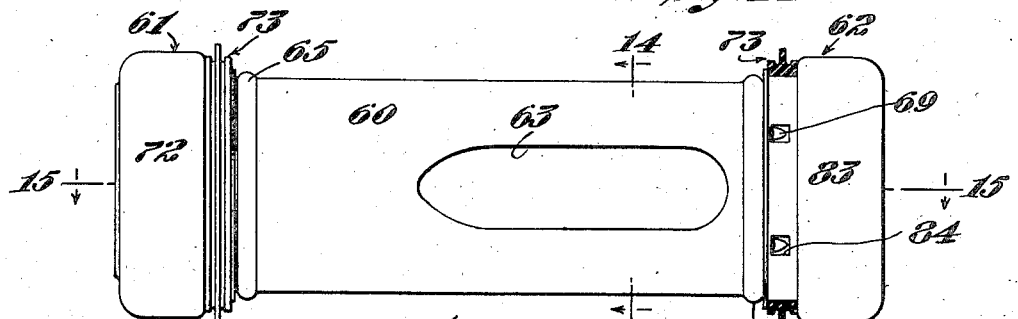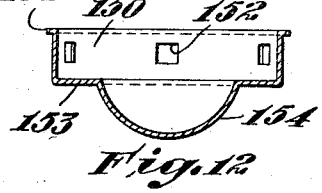

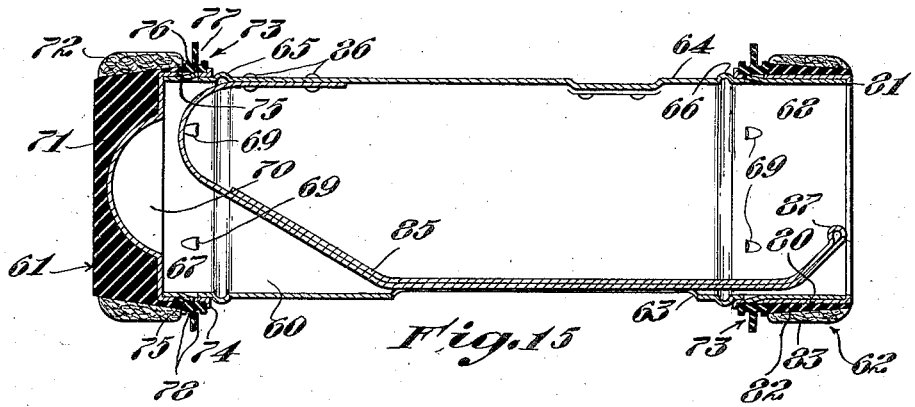
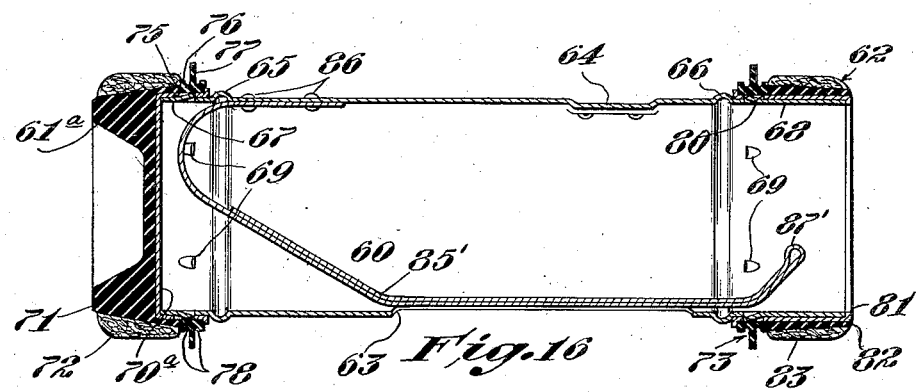
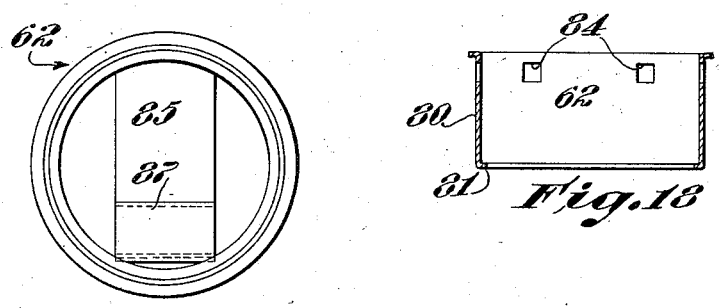

Patented Sept. 17, 1935

2,014,571

UNITED STATES PATENT OFFICE 2,014,571

PNEUMATIC DISPATCH SYSTEM

Chester S. Jennings, Syracuse, N. Y., assignor to The Lamson Company, Syracuse, N. Y., a corporation of Massachusetts Application October 31, 1933, Serial No. 696,015

10 Claims. (Cl. 243—32)

This invention relates to an improvement in pneumatic dispatch systems, and more particularly to the carriers employed therein.

The primary objects of this invention are to provide a carrier with a carrying compartment of great capacity and a larger opening through which access may be had to the compartment, such carrier including readily detachable and replaceable head units and being moreover simple in construction and less expensive to manufacture than the various carriers heretofore known.

A carrier embodying this invention differs from the previous types of carriers in various respects as, for example, in the construction of the carrier heads, the construction of the inner and outer shells, the method of joining the heads to the shells, and the provision of accelerator rings or skirts removably secured to the carrier heads.

Other objects of this invention and features of the illustrative embodiments thereof will appear from a consideration of the following description and of the drawings which form a part thereof, and in which Fig. 1 is a front view of a side opening carrier partially open, which embodies this invention;

Fig. 2 is a longitudinal section thereof on an enlarged scale taken along the line 2—2 of Fig. 1 with the carrier open;

Fig. 3 is a front view of the inner shell of such carrier;

Fig. 4 is a longitudinal section thereof taken along the line 4—4 of Fig. 3;

Fig. 5 is a bottom plan view thereof on an enlarged scale;

Fig. 6 is a cross-sectional view thereof, on an enlarged scale, taken along the line 6—6 of Fig. 3;

Fig. 7 is a side view of the outer shell of such carrier;

Fig. 8 is a bottom plan view thereof, on an enlarged scale;

Fig. 9 is a front view of the outer shell;

Fig. 10 is a cross-sectional view, on an enlarged scale, taken along the line 10—10 of Fig. 9;

Fig. 11 is a sectional view of one of the cups which form a part of the head unit;

Fig. 12 is a view similar to Fig. 11 of another form of cup used in carriers of the solid head type;

Fig. 13 is a front elevation of an end opening carrier which embodies this invention;

Fig. 14 is an enlarged cross section of such carrier taken along the line 14—14 of Fig. 13;

Fig. 15 is a longitudinal sectional view taken along the line 15—15 of Fig. 13;

Fig. 16 is a view similar to Fig. 15 showing a carrier of that type but differing in form;

Fig. 17 is a bottom plan view of either form of end opening carrier; and

Fig. 18 is a sectional view of a ring which constitutes one element of the head unit applied to the open end of such a carrier.

The side opening carrier comprises a body portion, formed by an inner shell 20 and an outer shell 21, and head units 22, such units being two in number and secured to the ends of the body portion, more specifically to the inner and outer shells respectively. The shells are, in accordance with the usual practice, tubular and of such dimensions that the outer shell may be slipped over one end of the inner shell and rotated thereon.

The inner shell 20 has an oval opening 25 in one side, is enlarged at one end to form a ring 26, and has a central opening 27 at the other end, such end being hereafter, for convenience in description, referred to as the lower end or base of the carrier. A recess 28 is formed in the edge of the base and a series of integral tongues 29 equall spaced are pressed out from the ring 26. The outer shell 21 has an oval opening 30 in its side bounded by an integral bead 31, a ring 32 at one end and, at the other end, hereafter designated as the lower end or base, a ring 33 provided with a plurality of equally spaced tongues 34 pressed outwardly from the surface thereof. The ring 26 of the inner shell and the ring 33 of the outer shell are of the same dimensions and are provided with the same number of outwardly projecting tongues.

In the base at the edge of the ring 33 is made a depression forming a stop 35 which extends into the interior of the shell. A central opening defined by an annular flange 36 is formed in the base of the shell, the other end being open. Annular bosses 37 and 38, which strengthen the walls of the shell, separate the rings 32 and 33 from the body of the shell. In the wall of the shell is formed a pocket 39 in which a card or ticket bearing a number or other indicia may be placed to designate the contents, destination or other information regarding the carrier.

The shells are connected by telescoping the inner shell 20 into the outer shell 21, the ring 32 of the outer shell butting against the ring 26 of the inner shell, the flange 36 of the outer shell entering the central opening 27 of the inner shell, and the recess 28 of the inner shell receiving the stop 35 of the outer shell. The flange 36 is spun over to prevent the separation of the shells and yet not to interfere with the relative rotation of the shells which is limited by the engagement of the stop 35 with the end walls of the recess 28. Such rotation permits the opening and closing of the carrier in the well known manner. A tongue 40, formed on one edge of the opening 25 in the inner shell, coacts with the bead 31 surrounding the opening 30 in the outer shell and thus locks the shells in either the fully open or the fully closed position.

Each head unit 22 comprises a cup 50, a buffer fixedly secured to said cup and here shown as consisting of a central hard rubber portion 51 surrounded by a fiber or felt ring 52, and a skirt 53. The buffer acts in the manner well known in this art, to contact with the walls of the transit tubes and hence is provided with a periphery of felt or fiber. It will of course be understood that the buffer may be made entirely of felt or fiber in accordance with the practice common to this art. The portion 51 has a depression 54 which receives the base and a portion of the wall of the cup 50, and is secured both to the cup 50 and the felt ring 52 in any suitable manner. This securement is here shown as the result of vulcanization in accordance with the disclosure made in the copending application of John T. Needham, Serial No. 631,184, filed August 31, 1932. The wall of each cup terminates in an outwardly extending flange 55 and is provided with a plurality of equally spaced apertures or recesses 56. The skirt 53 comprises a base 57 of such dimension that it surrounds the wall of the cup between the portion 51 and the flange 55 and an annular flange 58 which projects outwardly from the base 57. The flange is intermediate the ends of the base and grooves 59 are formed in the base at opposite sides of the flange so that the latter will function equally well no matter which end of the carrier may lead in its travel through a tube. When the carrier head is flat instead of having a central depression therein, as shown in Fig. 2, a cup 150 of the type shown in Fig. 12 is employed. This cup has an outwardly extending flange 151 and recesses 152 which correspond in structure and function to the flange 55 and recesses 56. Th base 153 of the cup has an outwardly extending boss 154 which is surrounded by the hard rubber portion of the head. The purpose of the boss 154 is to reduce the amount of hard rubber employed to form the central portion of the head and thereby to prevent any increase in the weights of carriers having flat heads over those having a central depression therein.

The head units are added to the shells after the latter have been telescopically assembled by pressing the cups onto the rings 26 and 33 of the inner and outer shells. It will be understood that the number and arrangement of the apertures or recesses 56 of the cups correspond to that of the tongues 29 and 34 of the shells, so that the tongues enter the apertures 56 of the cups and thus join the cups to the shells. The flanges 55 contact with the bosses 37 and 38 of the outer shell, and the wall of the cup secured to the ring 26 projects beyond it to define with the main body of the inner shell a pocket in which the ring 32 may turn freely.

The construction thus described results in a carrier, the interior of which is that of the inner shell except for the flange 36 of the outer shell and the upset portion forming the recess 28. The head units are secured to the outer walls of the shells and do not reduce the capacity of the carrier compartment. While the head units are fixed in position they can be easily removed or replaced when desired. For example, in the form shown in Fig. 2 the removal of the skirts 53 permits cutting away portions of the cup walls by a suitable tool or a pair of pliers to release the tongues 29 or 34. The access opening to the interior of the carrier is substantially as long as the distance between the head units. Hence a document as long as the interior of the carrier can be inserted with little difficulty.

Figs. 13 to 18 inclusive illustrate an end opening carrier embodying certain features of this invention. Such carrier comprises a body portion formed by a tubular shell 60, one end of which is closed by a head unit 61, and the other end of which is surrounded by a head unit 62. The shell 60 has an opening 63 and a pocket 64 in the wall thereof and annular reinforcing bosses 65, 66 adjacent each end. The opening 63 permits an inspection of the contents of the carrier without removal, and the pocket 64, like the pocket 39 of the first described embodiment, is adapted to carry a card or ticket. The shell terminates in rings 67 and 68 to which the head units are secured by means of outwardly projecting tongues 69.

The head unit 61 of the carrier shown in Fig. 15 is flat and comprises a cup 70 similar to the cup 150 of the side opening carrier, a buffer consisting of a central hard rubber portion 71, a ring of felt or fiber 72 surrounding the portion 71, and a skirt 73. The portion 71 is secured by vulcanization to the cup 70 and ring 72. The wall of the cup terminates in an outwardly projecting flange 74 and has a plurality of apertures 75 therein. The skirt 73 comprises a base 76 and an annular flange 77 projecting outwardly from the base intermediate the ends thereof, the base having annular grooves 78 therein at opposite sides of the flange. The head unit 61a of the carrier shown in Fig. 16 has a central depression therein and is similar to the head unit 22 of the side opening carrier previously described. Its construction is identical with that of the unit 61 with the exception of the cup 70a which is similar to the cup 50 (Fig. 11) and the same reference characters are used thereon without further description. The head unit of either type of carrier is snapped onto the ring 67, the tongue 69 and apertures 75 being suitably located so that they will interengage. The head unit 62 comprises a ring 80 terminating in an inwardly projecting flange 81, a buffer consisting of an intermediate rubber portion 82 and a ring 83 surrounding the portion 82, said portion being suitably joined to the rings 80 and 83 as by vulcanizing. The unit 62 is snapped onto the ring 68 and held thereon by the interengagement of the tongues 69 on the ring 68 and apertures 84 in the ring 80.

As pointed out above in the description of the previously described embodiment, the buffers of these head units may be made entirely of felt or fiber in accordance with the practice commonly followed in this art. The annular bosses 65 and 66 are preferably so located that the ends of the head units contact therewith when the carrier parts are assembled.

In order to hold the messages or other contents in position in the carrier there is provided a strap 85 secured at one end to the wall of the shell 60, as by rivets 86. The strap is preferably a strip of metal and the free end is bent back to form a loop 87 which, as shown in Figs. 14 and 15, projects toward the longitudinal center of the carrier. The strap 85, as shown in Fig. 13, holds a portion of the contents adjacent the opening 63 so that they can be seen or written upon therethrough.

The formation of the head units, as either flat (61 in Fig. 15) or with a central depression therein (61ª in Fig. 16), is a well known practice and due thereto the carriers upon their arrival at a certain point in the system are acted upon by separators (not shown) and those having one form of head are removed from the stream. See the patent to Maclaren No. 1,499,318, June 24, 1924. Both ends of the side opening carriers are made identical so that the separators operate in the same way no matter which end is in the lead. End opening carriers, however, have one end open and since, due to inadvertence or to the action of a preceding separator, the open end of a carrier might be in the lead as it reaches a separator, the straps vary in length so that the separator will operate successfully. Accordingly the loop 87 of the straps 85 for carriers having a flat end terminates at the end of the carrier and the loop 87' of the straps 85' for carriers having a recessed head terminates an appreciable distance from the end of the carrier. Thus the separator will function in the same way with such carriers regardless of which end is in the lead.

While two embodiments of this invention have been shown and described, I am not limited thereto, since other embodiments may be made without departing from the spirit and scope of the invention as set forth in the following claims.

I claim:

1. A pneumatic dispatch carrier including a cylindrical body portion providing a load-carrying compartment and head units removably secured to the ends of the central portion, said units each including a body engaging element, a felt ring and a hard rubber portion secured to and connecting said element and said ring.

2. A pneumatic dispatch carrier including a cylindrical body portion providing a load-carrying compartment and head units removably secured to the ends of the central portion, said units each including a body-engaging element having apertures therein and the ends of the body portion including tongues which enter the apertures in said element and secure it in position.

3. A pneumatic dispatch carrier including a cylindrical body portion providing a load-carrying compartment and head units removably secured to the ends of the central portion, said units each including an element which surrounds the end of the body portion and has apertures therein and the body portion having tongues projecting outwardly from the surrounded areas, which tongues enter the apertures in the elements and secure them in position.

4. A head unit for pneumatic dispatch carrier comprising a cup terminating in an outwardly projecting annular flange, a buffer having a felt periphery surrounding said cup and spaced from said flange, and a skirt having a base located in the space between the buffer and the flange.

5. A head unit for a pneumatic dispatch carrier comprising a cup, and a buffer fixedly secured to said cup and including a hard rubber central portion and a peripheral ring of felt.

6. A pneumatic dispatch carrier comprising a body portion and head units at the ends thereof, said body portion consisting of a tubular shell having a ring at each end thereof, and tongues projecting outwardly from said rings, said head units surrounding said rings and having apertures therein which receive said tongues and thereby secure the units to the rings.

7. A head unit for a pneumatic dispatch carrier comprising a cup having a boss extending outwardly from the base thereof, and a buffer fixedly secured to said cup and including a hard rubber portion enclosing said boss and a peripheral ring of felt.

8. A head unit for a pneumatic dispatch carrier comprising a cup terminating in an outwardly projecting annular flange and having a boss extending outwardly from the base thereof, a buffer fixedly secured to said cup and including a hard rubber portion enclosing said boss and a peripheral ring of felt surrounding said cup and spaced from said flange, and a skirt having a base located in the space between the buffer ring and the flange.

9. A pneumatic dispatch carrier including a cylindrical body portion providing a load-carrying compartment and head units at the ends of the central portion each said head unit including a skirt which comprises a base, and a flange projecting outwardly therefrom the base being provided with grooves at opposite sides of the flange so that the latter will function equally well no matter which end of the carrier may lead.

10. A pneumatic dispatch carrier including a cylindrical body portion providing a load-carrying compartment and head units at the ends of the central portion, each said head unit including an element which surrounds the end of the body portion and a skirt comprising a base which surrounds the element and the end of the body portion and a flange projecting outwardly from the base which is provided with grooves at opposite sides of the flange so that the latter will function equally well no matter which end of the carrier may lead.

CHESTER S. JENNINGS.